(12) United States Patent  
Mullaney et al.

(10) Patent No.: US 7,469,091 B2
(45) Date of Patent: Dec. 23, 2008

(54) OPTICAL FIBER TERMINATION APPARATUS AND METHODS FOR USING THE SAME

(75) Inventors: Julian Mullaney, Raleigh, NC (US); Roy Keller Thompson, Apex, NC (US); William Alan Carrico, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 65 days.

(21) Appl. No.: 11/314,871

(22) Filed: Dec. 21, 2005

(65) Prior Publication Data

US 2006/0133759 A1   Jun. 22, 2006

Related U.S. Application Data

(60) Provisional application No. 60/685,450, filed on May 27, 2005, provisional application No. 60/650,055, filed on Feb. 4, 2005, provisional application No. 60/638,866, filed on Dec. 22, 2004.

(51) Int. Cl.
*G02B 6/00* (2006.01)
(52) U.S. Cl. .................................... 385/139; 385/78
(58) Field of Classification Search ............... 385/129, 385/139, 78
See application file for complete search history.

(56) References Cited

U.S. PATENT DOCUMENTS

| | | | |
|---|---|---|---|
| 5,231,687 A * | 7/1993 | Handley .................... 385/139 |
| 5,440,665 A | 8/1995 | Ray et al. .................. 385/135 |
| 5,449,299 A | 9/1995 | Shimirak et al. ........... 439/417 |
| 5,528,718 A | 6/1996 | Ray et al. .................. 385/136 |
| 5,657,413 A | 8/1997 | Ray et al. .................. 385/139 |
| 5,708,742 A * | 1/1998 | Beun et al. ................... 385/53 |
| 6,151,432 A * | 11/2000 | Nakajima et al. ............. 385/60 |
| 6,167,183 A * | 12/2000 | Swain ........................ 385/135 |
| 6,579,014 B2 | 6/2003 | Melton et al. ................ 385/78 |
| 6,648,520 B2 | 11/2003 | McDonald et al. ........... 385/78 |
| 6,821,023 B2 * | 11/2004 | Grob et al. .................... 385/73 |
| 7,256,349 B2 * | 8/2007 | Allen et al. ................... 174/92 |
| 2001/0036342 A1 | 11/2001 | Knecht et al. ................ 385/84 |
| 2002/0057870 A1 | 5/2002 | Dean, Jr. et al. .............. 385/28 |
| 2003/0002812 A1 * | 1/2003 | Lampert ....................... 385/78 |
| 2003/0063866 A1 | 4/2003 | Melton et al. ................ 385/76 |
| 2003/0081910 A1 | 5/2003 | Gimbel et al. ............... 385/80 |
| 2003/0103750 A1 | 6/2003 | Laporte et al. ............. 385/134 |
| 2003/0123812 A1 | 7/2003 | Beatty et al. ................. 385/72 |

(Continued)

*Primary Examiner*—Ellen Kim
(74) *Attorney, Agent, or Firm*—Myers Bigel Sibley & Sajovec

(57) ABSTRACT

An optical fiber termination apparatus includes a body portion having an optical fiber outlet therein and a connector receiving portion extending from the body portion and having an outer wall defining an optical fiber connector receiving chamber and having an opening to the connector receiving chamber at an end thereof spaced from the body portion. An optical connector is positioned in the opening, wherein the opening is configured to receive the optical connector therein without rotating the optical connector relative to the connector receiving portion. A sealing member is positioned between the optical connector and the outer wall of the connector receiving portion to seal a gap therebetween. A cover is positioned on the optical connector and the connector receiving portion that retains the optical connector in the opening and compresses the sealing member between the outer wall of the connector receiving portion and the optical connector without rotating the optical connector relative to the connector receiving portion.

24 Claims, 10 Drawing Sheets

U.S. PATENT DOCUMENTS

| | | | |
|---|---|---|---|
| 2003/0210871 A1 | 11/2003 | Rosson et al. | 385/78 |
| 2003/0235374 A1 | 12/2003 | Luther et al. | 385/85 |
| 2004/0047566 A1 | 3/2004 | McDonald et al. | 385/78 |
| 2004/0047567 A1 | 3/2004 | Gimbel et al. | 385/80 |
| 2004/0101255 A1 | 5/2004 | Dean, Jr. et al. | 385/85 |
| 2004/0114874 A1 | 6/2004 | Bono et al. | 385/53 |
| 2004/0120656 A1 | 6/2004 | Banas et al. | 385/86 |
| 2004/0123998 A1 | 7/2004 | Berglund et al. | 174/92 |
| 2004/0126069 A1 | 7/2004 | Jong et al. | 385/189 |
| 2004/0152354 A1 | 8/2004 | Luther et al. | 439/378 |
| 2004/0252960 A1 | 12/2004 | Battey et al. | 385/135 |
| 2005/0031285 A1 | 2/2005 | Barnes et al. | 385/134 |
| 2005/0036742 A1 | 2/2005 | Dean, Jr. et al. | 385/71 |
| 2005/0041926 A1 | 2/2005 | Elkins et al. | 385/53 |
| 2005/0069264 A1 | 3/2005 | Luther et al. | 385/59 |
| 2005/0105873 A1 | 5/2005 | Reagan et al. | 385/135 |
| 2005/0111799 A1 | 5/2005 | Cooke et al. | 385/100 |
| 2005/0111800 A1 | 5/2005 | Cooke et al. | 385/100 |
| 2005/0129375 A1 | 6/2005 | Elkins et al. | 385/100 |
| 2005/0129379 A1 | 6/2005 | Reagan et al. | 385/135 |
| 2005/0145522 A1 | 7/2005 | Bloodworth et al. | 206/409 |
| 2005/0163448 A1 | 7/2005 | Blackwell, Jr. | 385/135 |
| 2005/0175307 A1* | 8/2005 | Battey et al. | 385/135 |
| 2005/0175308 A1 | 8/2005 | Elkins, II et al. | 385/135 |
| 2005/0180705 A1 | 8/2005 | Elkins, II et al. | 385/100 |
| 2005/0185895 A1 | 8/2005 | Keenum et al. | 385/76 |
| 2005/0185910 A1 | 8/2005 | Zimmel | 385/135 |
| 2005/0207711 A1 | 9/2005 | Vo et al. | 385/94 |
| 2005/0220421 A1 | 10/2005 | Keenum et al. | 385/62 |
| 2005/0232567 A1 | 10/2005 | Reagan et al. | 385/135 |
| 2006/0280420 A1* | 12/2006 | Blackwell et al. | 385/135 |

* cited by examiner

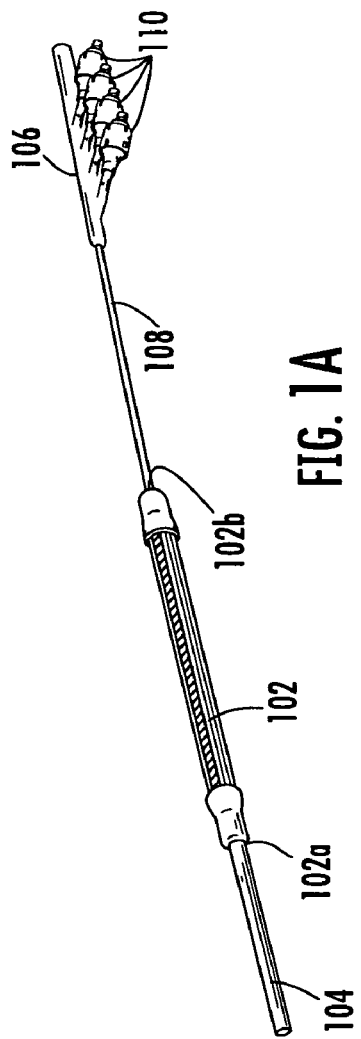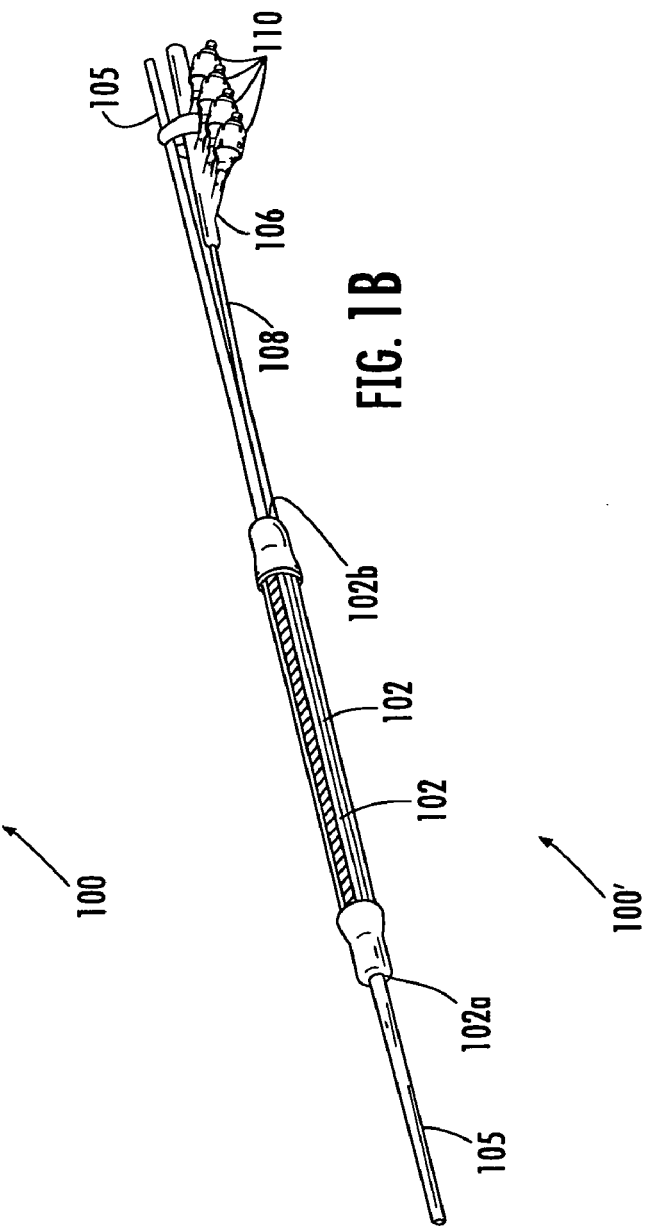

OPTICAL FIBER TERMINATION APPARATUS AND METHODS FOR USING THE SAME

RELATED APPLICATIONS

The present application claims priority from U.S. Provisional Applications No. 60/638,866, filed Dec. 22, 2004, 60/650,055 filed Feb. 4, 2005, and 60/685,450, filed May 27, 2005, the disclosures of which are hereby incorporated herein in their entirety by reference.

BACKGROUND OF THE INVENTION

The present invention relates to communication cable termination devices and, more particularly, to optical fiber termination apparatus and methods for using the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber-based communications network infrastructure. The carrying capacity and communication rate capabilities of such equipment may exceed that provided by conventional copper wired systems. However, this cable based infrastructure is generally required to be flexibly field installed to allow for additions and deletions of service at access points as the customer mix for a telecommunications provider changes. Accordingly, subscriber optical fiber drop cable access points are typically required for configuring the network to provide services to different customers, For the optical fiber infrastructure, it is generally desirable to provide sealed environmental protection and flexible incremental connection of subscriber drop cables to provide for rapid and reduced cost deployment of services to different customers. A variety of different products are available for use at access points in optical fiber-based communications networks. For example, the OptiSheath™ Advantage Terminal, available from Corning Incorporated of Corning, N.Y., is available with customer options to accommodate add-as-you-grow applications. The OptiSheath™ is available in six, eight or twelve port customer options, which may be utilized for aerial or buried terminal use in an optical access architecture allowing for subscriber connection. Cables of varying lengths may be preterminated inside the factory for use in the OptiSheath™ Advantage Terminal and the multiport options may allow for configuration in the field of each terminal location based on customer take length and stub length. The actual connection point in the OptiSheath™ Advantage Terminal utilizes a specific tap and drop cable specification to provide for the actual subscriber drop cable installation at the OptiSheath™ Advantage Terminal. In particular, the OptiTap™ Connector is included in the OptiSheath™ Advantage Terminal and the OptiFit™ Drop Cable may be removably coupled through the OptiTap™ to link subscribers to the optical fiber communications network. Utilization of such a standard connector type infrastructure may provide for rapid installation of fiber optic cables. However, there is a risk with such a configuration that a loss of environmental seal on any one port may expose other ports within a terminal to environmental contamination and associated degradation.

SUMMARY OF THE INVENTION

Embodiments of the present invention include optical fiber termination apparatus having a body portion having an optical fiber outlet therein. A connector receiving portion extends from the body portion and has an outer wall defining an optical fiber connector receiving chamber and having an opening to the connector receiving chamber at an end thereof spaced from the body portion. An optical connector is positioned in the opening, wherein the opening is configured to receive the optical connector therein without rotating the optical connector relative to the connector receiving portion. A sealing member is positioned between the optical connector and the outer wall of the connector receiving portion to seal a gap therebetween. A cover is positioned over the optical connector and the connector receiving portion that retains the optical connector in the opening and compresses the sealing member between the outer wall of the connector receiving portion and the optical connector without rotating the optical connector relative to the connector receiving portion.

In other embodiments, the cover is slidably positioned over the connector receiving opening and an outer surface of the connector receiving portion is configured to receive and retain the cover without rotating the optical connector relative to the connector receiving portion. A retainer tab may be provided on the outer surface of the connector receiving portion and a retainer tab receiving opening on the cover may be positioned to receive and retain the retainer tab when the cover is positioned over the optical connector at a position that compresses the sealing member. The cover may be coupled to the connector receiving portion so as to limit rotational movement of the cover relative to the connector receiving portion and to limit rotational movement of the optical connector relative to the connector receiving portion.

In further embodiments, the connector receiving chamber has a size less than a minimum fiber bend radius requirement for an optical fiber. An optical fiber may extend into the connector receiving chamber from the body portion and be optically coupled to a backside of the optical connector. The optical fiber may be free of loops in the connector receiving chamber.

In other embodiments, the optical fiber termination apparatus may include a plurality of connector receiving portions extending from the body portion, each of the connector receiving portions including an optical connector therein and a sealing member positioned between the respective optical connectors and outer walls of the respective connector receiving portions. The body portion may include a plurality of branch off sections, each of the branch of sections including a main passageway portion and a branch off passageway portion. The branch off sections may be coupled together at ends of the main passageway portions to define a main passageway extending therethrough. One of the connector receiving portions may be positioned at an end of each of the branch off passageway portions displaced from the main passageway with a branch off passageway of each passageway portion extending from the main passageway to the receiving chamber of its respective connector receiving portion to allow an optical fiber from the receiving chamber to extend through the branch off passageway to the main passageway. An overmolding layer may be provided over the branch off sections.

In some embodiments, the branch off passageway portion further includes an intersection portion extending from the main passageway portion and a tube portion extending from the intersection portion to the connector receiving portion. A plurality of branch off passageway portions may extend from each main passageway portion. A plug may be provided in an end of the main passageway of a last of the coupled together branch off sections that seals the main passageway. Each of the main passageway portions and their respective intersection portion may be unitary molded members. A removable cap may be provided covering a front side optical receptacle of the optical connector.

In yet other embodiments, the body portion includes a junction member having an inlet passageway therein coupled to a plurality of outlet passageways. A tubing section extends from each of the plurality of outlet passageways. One of the connector receiving portions is positioned on an end of each of the tubing sections displaced from the junction member, wherein the tubing sections couple the receiving chamber of the connector receiving portions to the respective outlet passageways. An overmolding layer may be provided over the junction member and an end of each of the tubing sections adjacent thereto. The junction member may include an upper part and a lower part coupled to the upper part. The upper and/or lower part may define the inlet passageway and the plurality of outlet passageways. A plurality of connectors may couple the upper and lower parts.

In further embodiments, the apparatus further includes a splice container defining a splice chamber therein. An optical cable extends from the splice chamber to the body portion. The optical cable includes an optical fiber extending to the receiving chamber and coupled to a backside of the optical connector. The splice container includes a first opening configured to receive the optical cable extending from the splice chamber and a second opening configured to receive an optical fiber cable including an optical fiber to be spliced to the optical fiber extending to the receiving chamber. The splice container may further include an end portion having a first opening into the splice chamber configured to receive one of the optical fiber from the optical cable extending from the receiving chamber or the optical fiber to be spliced thereto and a second opening configured to receive a strength member associated with the one of the optical fiber from the optical cable extending from the receiving chamber or the optical fiber to be spliced thereto, the second opening being radially displaced from the first opening a distance selected to separate the strength member from the optical fiber to allow a sealant material to flow therebetween to environmentally seal an inside of the optical cable extending from the receiving chamber or the optical fiber cable including the optical fiber to be spliced thereto.

In other embodiments, the body portion includes a longitudinally extending taut sheath splice closure having openings on longitudinally displayed ends thereof configured to receive an optical fiber cable extending through the body portion. The body portion may include a plurality of branch off sections, each of the branch off sections including a main passageway portion and a branch off passageway portion, the branch off sections being coupled together at ends of the main passageways.

In yet further embodiments, an entry sealing member for an optical fiber cable includes a body portion configured to be sealingly received in an opening to a splice chamber. A first longitudinally extending opening through the body portion is configured to receive an optical fiber from the optical fiber cable and a second longitudinally extending opening through the body extends substantially in parallel with the first opening and is configured to receive a strength member from the optical fiber cable. The second opening is radially displaced from the first opening a distance selected to separate the strength member from the optical fiber to allow a sealant material to flow therebetween to environmentally seal an inside of the optical fiber cable.

In other embodiments, a taut sheath optical fiber termination apparatus includes a longitudinally extending taut sheath splice closure having a cross-sectional area selected to accommodate a taut sheath splice to selected ones of a plurality of optical fibers extending therethrough. A first and second opening on longitudinally displayed ends of the splice closure are configured to receive an optical fiber cable extending through the splice closure, the optical fiber cable including the plurality of optical fibers. A plurality of connector receiving portions extend from the splice closure, each of the connector receiving portions being configured to receive an optical connector therein. An optical connector is positioned in each of the connector receiving portions. A sealing member may be positioned between the optical connector and the connector receiving portion to seal a gap therebetween and a cover may be positioned over the optical connector and the connector receiving portion that retains the optical connector in the connector receiving portion and compresses the sealing member between the connector receiving portion and the optical connector without rotating the optical connector relative to the connector receiving portion. The connector receiving portions may each have an optical fiber connector receiving chamber and an opening to the connector receiving chamber at an end thereof displaced from the splice closure, the opening being configured to receive the optical connector therein, and the optical connectors may be positioned in openings.

In further embodiments, methods of inserting an optical connector in a connector receiving portion of a housing include attaching an optical fiber in the connector receiving portion to a backside optical connection member of the optical connector. The optical connector with the optical fiber attached thereto is inserted in an optical fiber connector receiving chamber of the connector receiving portion through an opening thereto in an end of the connector receiving portion displaced from the housing. A sealing member is positioned between the optical connector and the connector receiving portion to seal a gap therebetween. A cover is placed over the optical connector and the connector receiving portion to retain the optical connector in the opening and to compress the sealing member without rotating the optical connector relative to the connector receiving portion.

BRIEF DESCRIPTION OF THE DRAWINGS

FIG. 1A is a perspective view illustrating an optical fiber termination assembly coupled to an optical fiber drop cable according to some embodiments of the present invention;

FIG. 1B is a perspective view illustrating an optical fiber termination assembly coupled to an optical fiber main cable according to some embodiments of the present invention;

DETAILED DESCRIPTION OF EMBODIMENTS OF THE INVENTION

Figure 2:
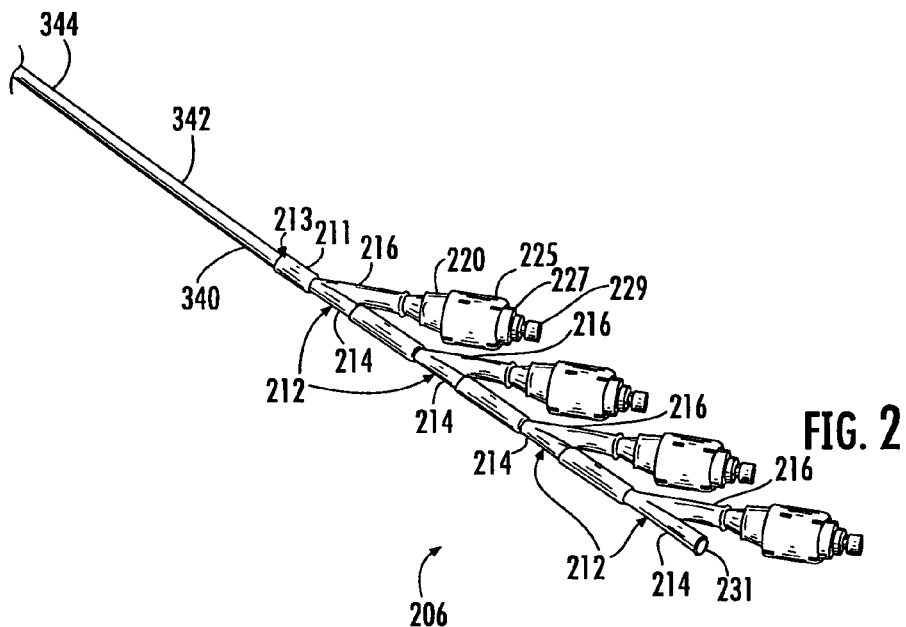
FIG. 2 is a perspective view illustrating an optical fiber termination apparatus according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Embodiments of the present invention will now be described with reference to the various embodiments illustrated in FIGS. 1-17.

An optical fiber termination assembly 100 according to some embodiments of the present invention will now be described with reference to the perspective illustration of FIG. 1A. An optical fiber termination apparatus 106, which may also be referred to herein as an optical terminal, is provided that, in some embodiments, uses a tubular manifold to create a fiber pathway leading from a connector end 110 (e.g., SC connectors, Optitap™, etc.) to at least one tubular end, which can then be attached to other fibers. The other fibers to which it is attached can be, for example, the optical fibers of a drop cable 104, a main cable and/or those of another fiber splice closure. The illustrative termination assembly 100 of FIG. 1A includes an optical termination apparatus 106 with four optical connector ends 110 defining tap points to the fiber drop cable 104.

The terminal illustrated in FIG. 1A, in various embodiments, may provide a means to join fiber cable to a tube, may use a tube exiting/entering into a splice closure for means of transporting a fiber, may use ribbon splicing of receptacles to flat drop and may include no slack loops inside. Thus, it may be very narrow, may provide a means to add SC connector/Optitap™ connector into a manifold and secure the same therein without threads or a back mounting nut as commonly used with panel mounted connectors of these types, may provide a means to secure an SC connector/Opitap™ without allowing rotation of the connectors or threads thereon and may utilize a stackable manifold providing many selectable configurations.

The receptacle manifold of the termination apparatus 106 illustrated in FIG. 1A may be constructed many ways, and is shown as a sealed construction made from a dual molding process. As will be further described herein, in some embodiments, inside the sealed construction is a hard plastic tubular "Y" shaped branch off similar to a 45 degree plumbing fitting.

These branch offs can be stacked together in many ways to form single, double, triple, quadruple, etc. branch off manifolds. The stacked branch offs may then be overmolded with a second plastic material, which may bond to the branch offs and any cable or additional tubing in the manifold structure. This may provide a very strong sealed piping structure to which the fiber optic connectors and the fibers themselves can be added later. Many configurations of manifolds can be created this way using the stackable branch offs and various lengths of tubing. The result can be viewed as analogous to a custom made wiring harness with a tree and branch structure, except that it is a tubular harness to which the fiber is added and thereby may be contained and protected.

In configurations containing significant lengths of tubing, the tubing may have an internal strength member to prevent the tubing from excessive stretching during the service life. The strength member function may be provided, for example, by co-extrusion of a high tensile material (such as Kevlar™, aramid yarn, fiber glass strands, weave, etc.) within the wall section of the tubing itself, and/or using a multi-layered tubing with high strength material forming the core and different bondable material on the outer surface layer.

Once the manifold is made, the fibers and connectors may be added. The illustrated embodiments of the optical fiber termination apparatus in FIG. 1A are shown as accommodating a particular connector adapter style called Optitap™, which is made by Corning, although other connectors and connector adapters can be accommodated in a similar manner. The illustrated embodiments allow the connector end 110 of the manifold to feed a fiber and standard SC connector, which is plugged into an OptiTap™ bulkhead adapter into the manifold, and to attach the OptiTap™ adapter portion without using screw threads. Also, the fiber and OptiTap™ do not have to be rotated (screwed in) within the manifold to attach them. This offers the advantage that fibers may not be not twisted during the assembly of the product. A section of the connector end may contain an area for an O-ring or the like to seal the manifold where the OptiTap™ adapter (or other optical connector) joins the manifold. No access may be needed on the inside of the manifold to make this assembly, and no slack fiber storage area may be required on the inside behind the OptiTap™ to make the connection.

Furthermore, the design of the features on the connector end of the manifold are such that, once assembled, the OptiTap™ adapter may be restrained from rotating within the manifold. Torque is typically applied when a field installer removes the OptiTap™ blank off plug, and/or inserts the male portion of the OptiTap™ (not shown) at a later date. If, at that time, any rotation of the OptiTap™ or other components were to occur, then twisting and damage could result to the fiber inside the product. Because no fiber slack loops are needed there may be no fiber bend radius requirements, and consequently the entire connector area of the manifold may be made very narrow. This size reduction may be an advantage in some applications.

The fully assembled manifold containing the fibers and the adapters (in this case OptiTap™ connectors) may then be attached to a single fiber optic cable, or it may be attached to multiple fiber optic cables, or fiber optic splice closures. In FIG. 1A, it is shown attached to a single fiber optic cable 104 of the flat drop cable type. In these embodiments, a unique method is also provided to join the fiber cable to the tubular end of the manifold. This may be achieved by a tubular (or partially tubular) semi-rigid device (splice closure) 102 shown that may provide the following features. It may allow access to the multiple fiber(s) that exit the manifold and the fiber(s) in the flat drop cable so as to enable ribbonizing and mass fusion splicing of the some of the fibers. This may result in one or more mass fusion splices, or one or more single fiber splices or a mixture depending on the exact configuration of the manifold and cable. In order to perform the splicing the semi-rigid device may be temporarily moved out of the way to allow splice equipment access, and then re-attached to the cable and tube afterwards. In this case the tubular semi-rigid device may be advantageous because it permits ribbonizing and mass fusion splicing which may thereby eliminate the need for having slack loops in the fibers and associated required bend radii and, thus, the entire finished device can be much smaller in diameter. Splicing approaches that may be utilized with some embodiments of the present invention for the device 102 are also described in commonly assigned U.S. Pat. No. 5,440,665, issued Aug. 8, 1995, the disclosure of which is incorporated herein by reference in its entirety.

Another feature of some embodiments of the semi-rigid device and the associated ancillary components is that once the splicing (ribbonized and mass fusion spliced, or single) is complete, the distance between the tubular end of the manifold and the flat drop (or other) cable can be adjusted so as to accommodate variations in the length of fiber between them. The design of the semi-rigid device allows this adjustment. Thus, even if more than one attempt at fusion splicing and re-splicing must be made, causing the exposed length of fiber to be significantly shorter, the finished length can still be accommodated without slack loops. Other embodiments include a device on or attached to at least one end of the semi-rigid device that prevents the cable's strength members from moving into the splice area and also partially separates the strength members from the buffer tubes (or central core tube) so as to allow a sealant, such as hot melt adhesive, or other sealant materials to flow in between and create a barrier between the cable annular spaces and the splicing area. Such features are illustrated, for example, in FIGS. 13A and 13B.

A cover for the semi-rigid device may be used to enclose the splicing area of the joint between the manifold and the cable (or cables, or splice), thereby allowing the entire joint to be covered by an outer mechanical sealed device. The cover may be a separate piece, or a section of the semi-rigid device which hinges, slides, or folds over the splice opening. In the embodiments of FIG. 1A, the outer sealing is achieved by using heat shrink tubing with hot melt adhesive inside the tubing. When shrunk, this may provide sealing, strain relief, and/or mechanical durability for the finished product. It also may seal the splice area from the annular space within the drop cable itself. The outer sealing function can also be achieved by using a mechanical closure other than heat shrink tubing, such as a rigid or semi-rigid closure using two half shell structures providing similar sealing and strain relief for the cable and the semi-rigid device inside.

As shown in the embodiments of FIG. 1A, the optical fiber termination apparatus 106 is coupled to the splice closure 102 by a protective tube 108 with an optical fiber cable therein passing through an opening 102b on one end of the splice closure 102 while the drop cable 104 enters the splice closure 102 through a longitudinally displaced second opening 102a of the splice closure 102. The splice closure 102 defines a splice chamber therein. An optical cable may extend inside the tube 108 from the splice chamber into the optical termination apparatus 106 where it may terminate in a receiving chamber where it may be coupled to a back side of an optical connector defining the connector end 110 in each of the branch offs. Thus, an optical fiber from each of the connector ends 110 may be coupled to a respective fiber in the drop cable 104 in the splice closure 102.

In addition to splicing the manifold to a single fiber optic cable using the means described above, a manifold may be attached to a splice closure 102 of various configurations including a taut sheath splice as shown in the embodiments of FIG. 1B. The embodiments of an optical fiber termination assembly 100' shown in FIG. 1B is a taut sheath splice where the main cable 105 is not cut, and some of the fibers in the main cable 105 are uninterrupted and continue in an "expressed" manner through the splice closure 102 without being severed, spliced, or looped. The advantage of using the manifold type structure 106 disclosed in the embodiments of FIG. 1B may include that the fibers for the manifold may be ribbonized, and mass fusion spliced to one or more of the fibers or ribbon fibers contained in the main cable 105. In this way, one or more of the fibers or ribbon fibers in the main cable may be cut and spliced to the ribbonized (or non-ribbonized) fibers protruding from the manifold. The ability to adjust the finished position of the manifold relative to the main cable enables the completed assembly to be situated such that no slack loops are required to accommodate excess fiber lengths and the final product can have a small diameter. Similar features for strain relief, internal adjustment, and/or outer sealing by heat shrink or non-heat shrink means may be used to provide an outer cover as in the flat drop cable embodiments described with reference to FIG. 1A.

The embodiments of FIG. 1B may beneficially use a tube 108 exiting/entering into the splice closure 102 for means of transporting a fiber, provide a taut sheath without loops; an SC connector/OptiTap™ receptacle, provide a taut sheath plus tube plus ribbonizing, provide a taut sheath plus tube to receptacle connection, provide a taut sheath to any fiber terminal using tube, flat drop cable, and the like and may utilize no slack loops inside and be very narrow.

Figure 3:
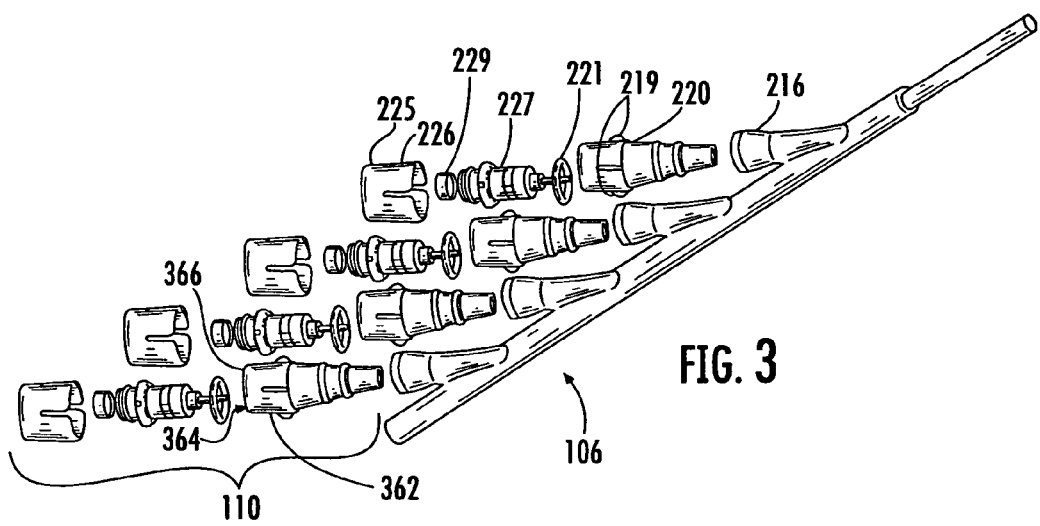
FIG. 3 is an exploded perspective view of the optical fiber termination apparatus of FIG. 2.

An optical fiber termination apparatus 206 according to further embodiments of the present invention will now be described with reference to FIGS. 2 and 3. As shown in FIGS. 2 and 3, an optical fiber termination apparatus 106, 206 includes a body portion 211 having an optical fiber outlet 213 therein for passing an optical fiber or fibers from the termination apparatus 106, 206 to a connection point, such as the splice closure 102 illustrated in FIGS. 1A and 1B. For the embodiments illustrated in FIGS. 2 and 3, the body portion 211 includes four stacked branch off sections 212 providing Y-shaped manifold sections connected to provide a 4-tap manifold structure. Each of the branch off sections 212 includes a main passageway portion 214 and a branch off passageway portion 216. The branch off sections 212 are coupled together at ends of the main passageway portions 214 to define a main passageway extending therethrough. Connector receiving portions 220 are positioned at an end of each of the branch off passageway portions 216 displaced from the main passageway with a branch off passageway of each passageway portion 216 extending from the main passageway to a receiving chamber of its respective connector receiving portion 220. As shown in FIG. 3, the receiving chamber 366 may have an opening 364 to the connector receiving chamber 366 on an end thereof displaced from the body portion 211. The opening 364 may be configured to receive an optical connector 227 therein without rotating the optical connector 227. An optical connector 227 may be positioned in the opening of each of the connector receiving portions 220 without rotating the optical connector 227 relative to the connector receiving portion 220. A sealing member 221 is shown positioned between the optical connector 227 and an outer wall 362 of the connector receiving portion 220 to seal a gap therebetween. It will be understood that the referenced to an "outer" wall as used herein is relative to the receiving chamber 366 and other features may be provided radially outside of the "outer" wall.

A cover 225 is positioned over the optical connector 227 and the connector receiving portion 220. The cover 225 retains the optical connector 227 in the opening 366 and compresses a sealing member 221 between the outer wall 362 of the connector receiving portion 220 and the optical connector 227 without rotating the optical connector 227 relative to the connector receiving portion 220. As shown in the embodiments of FIGS. 2 and 3, the cover 225 may be slidably positioned over the connector receiving opening 366 and the outer surface 364 of the connector receiving portion 220 may be configured to receive and retain the cover 225 without rotating the optical connector 227 relative to the connector receiving portion 220. For example, as illustrated in the embodiments of FIGS. 2 and 3, a retainer tab(s) 219 may be provided on the outer surface 364 of the connector receiving portion 220. A retainer tab receiving opening(s) 226 on the cover 225 may be positioned to receive and retain the retainer tab(s) 219 when the cover 225 is positioned over the optical connector 227 at a position that compresses the sealing member 221. It will be understood that the cover 225 may be slidably received within rather than over the connector receiving portion 220. The cover 225 in some embodiments may also be coupled to the connector receiving portion 220 so as to limit rotational movement of the cover 225 relative to the connector receiving portion 220 and/or to limit rotational movement of the optical connector 227 relative to the connector receiving portion 220.

As further shown in the embodiments of FIG. 2, an optical fiber or fibers extending from the respective optical connectors 227 may pass through the opening 213 into a protective tube 340 or optical fiber cable and from there into a splice closure 342 to be connected to fibers received from an optical fiber cable 344. As such, the main passageway defined by the main passageway portions 214 and the respective branch off passageways in the branch off passageway portions 216 may be configured to allow an optical fiber to extend from the receiving chamber 364 through the branch off passageway to the main passageway and then through the tube 340 to the splice chamber 342. Each of the optical connectors 227 may then be activated by coupling to an optical fiber from a drop cable or main cable extending to a central office of an optical network service provider.

Figure 4:
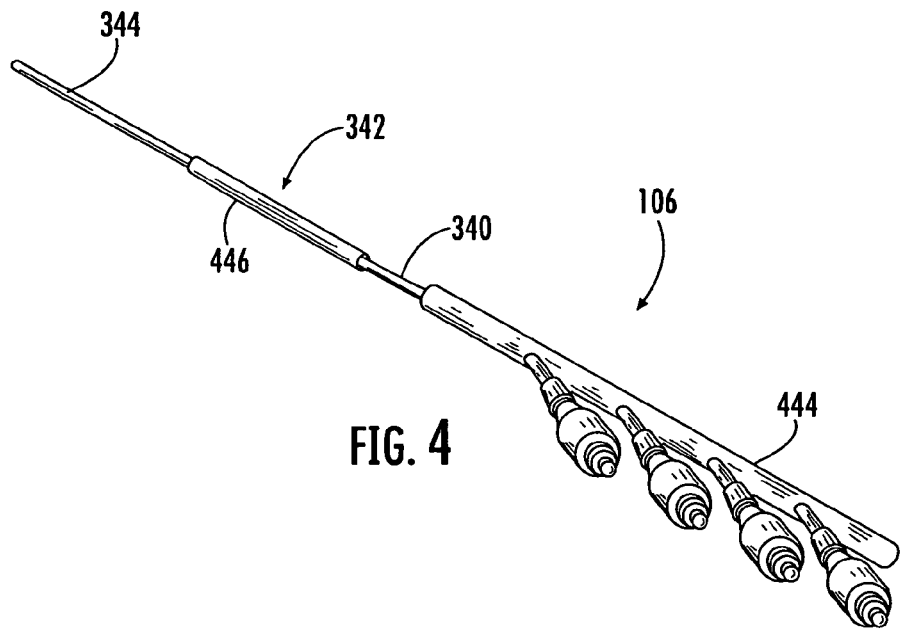
FIG. 4 is a perspective view illustrating the optical fiber termination apparatus of FIG. 3 with overmolding according to some embodiments of the present invention.

Note that, as shown in FIGS. 2 and 3, the respective optical fiber termination apparatus 106, 206 are substantially identical except for the presence of an overmolding layer as will now be described with reference to FIG. 4. FIG. 4 is a perspective view illustrating the optical fiber termination apparatus of FIG. 2 with overmolding according to some embodiments of the present invention. As shown in FIG. 4, the overmolding 444 covers the branch off sections 212 as well as a portion of the tube 340. Overmolding 446 is also shown enclosing the splice closure 342 and extending over an end portion of the optical fiber cable 344. The overmolding 444, 446 may provide both strength and environmental sealing properties for the optical fiber termination apparatus of FIG. 4.

Figure 5:
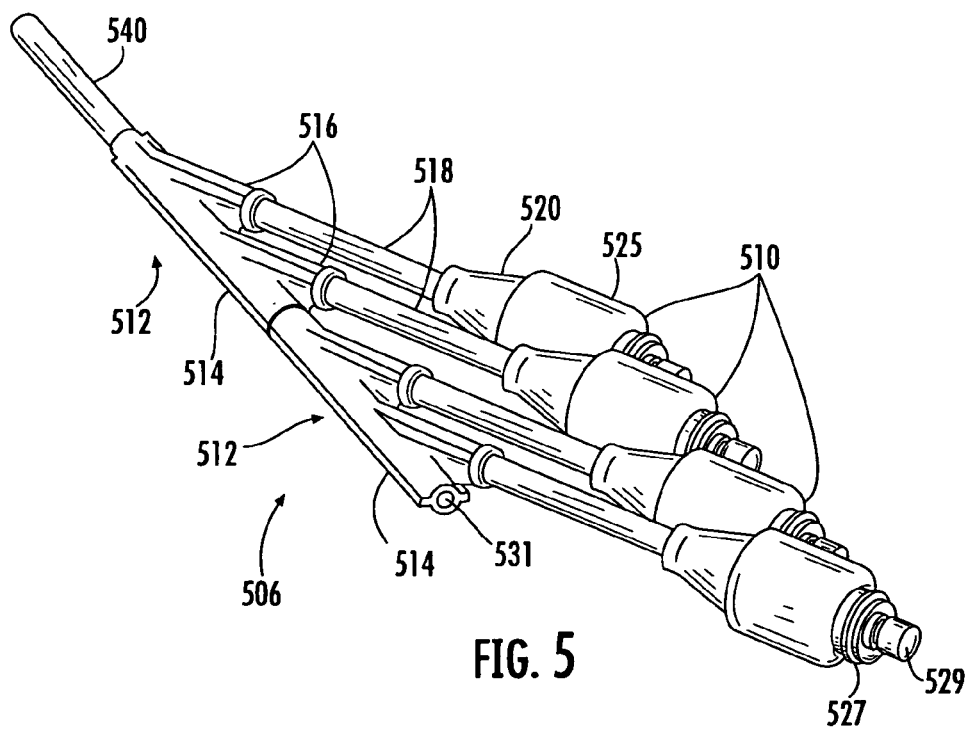
FIG. 5 is a perspective view illustrating an optical fiber termination apparatus according to further embodiments of the present invention.

Further embodiments of an optical fiber termination apparatus 506 will now be described with reference to the perspective view illustrations of FIGS. 5 and 6. The like-numbered elements (e.g., "212" and "512") in FIGS. 5 and 6 generally correspond to the description provided previously with respect to the embodiments of FIGS. 2 and 3. As shown in the embodiments of FIG. 5, a plurality of branch off sections 512 each include a main passageway portion 514 and a plurality of branch off passageway portions including an intersection portion 516 extending from the main passageway portion 512 and a tube portion 518 extending from the inner section portion 516 to a connector receiving portion 520. The embodiments of FIG. 5 differ from those of FIGS. 2 and 3 in part through the use of a plurality of branch off passageways 516 from each of the main passageways 514 and in the use of a tube 518 coupling the intersection portions 516 and the connector receiving portions 520. The tubes 518 may provide protection for optical fibers extending from the respective optical connector receiving portions 520 to the main passageway defined by the main passageway portions 514, which optical fibers may then pass through the main passageway and into a protective tube 540 or an optical fiber cable. The main passageway portion 514 and the respective intersection portions 516 are shown as unitary molded members in the embodiments of FIG. 5. Also shown in the embodiments of FIG. 5 is a plug 531 in an end of a main passageway defined by the main passageway portions 514 in a last of the coupled-together branch off sections 512. The plug 531 may be used to seal the main passageway so as to provide an environmentally protected optical fiber termination apparatus 506.

Figure 6:
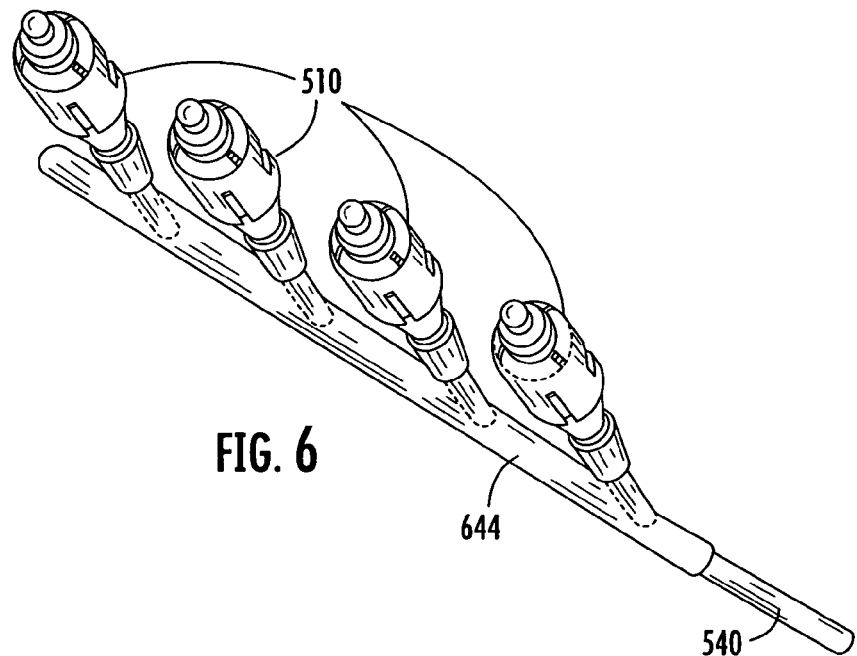
FIG. 6 is a perspective view illustrating the optical fiber termination apparatus of FIG. 5 with overmolding according to some embodiments of the present invention.

In the embodiments of FIGS. 5 and 6, four connector ends 510 are illustrated, each including an optical connector 527 therein with a protective cap 529 as shown over a front side optical connection member of each of the optical connectors 527. Thus, each of the sections 512 provides two Y-shaped tap points. Four tap points may thereby be provided by coupling two of the branch off sections 512. Furthermore, the plug 531 may later be removed to allow adding of additional branch off sections. Note that a cap or the like may be used, rather than plug 531, to provide a closed end to the main passageway in various embodiments of the present invention. FIG. 6 shows the optical fiber termination apparatus 506 with an overmolding 644 over the optical fiber termination apparatus 506 and a coupling portion of the tube 540 feeding into an end thereof.

Figure 7:
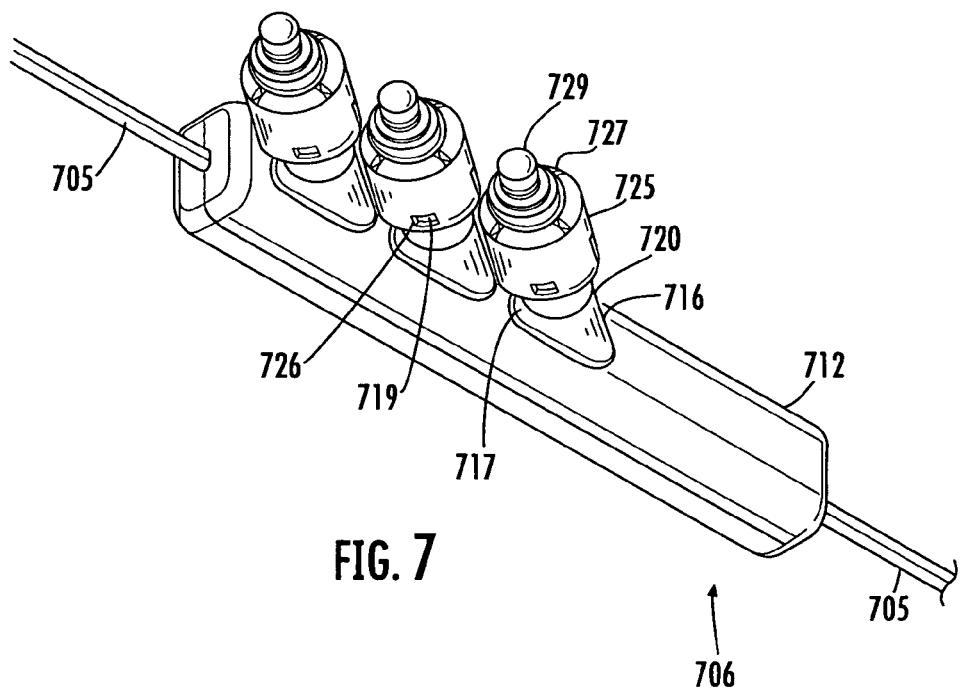
FIG. 7 is a perspective view of a taut sheath optical fiber termination apparatus according to some embodiments of the present invention.
Figure 8:
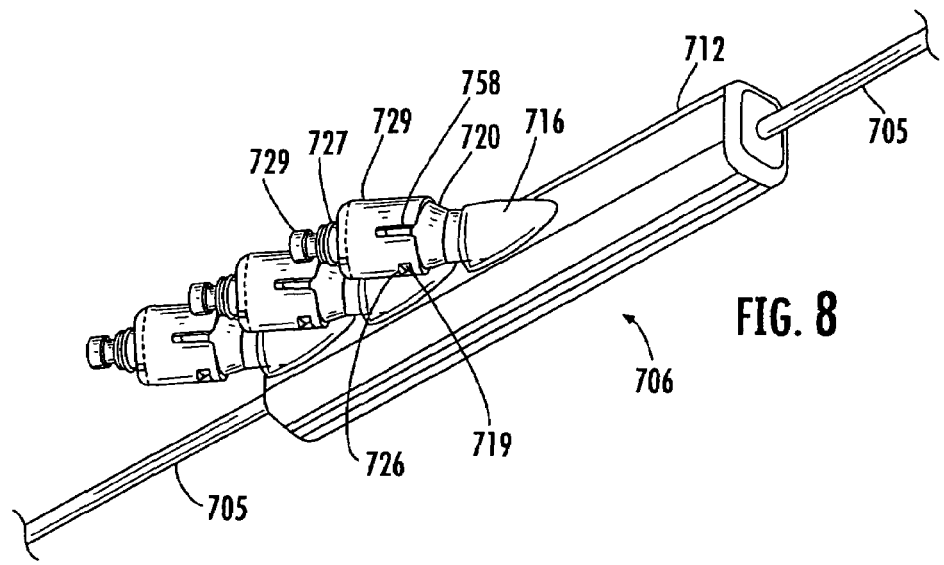
FIG. 8 is a perspective view of the optical fiber termination apparatus of FIG. 7.
Figure 9:
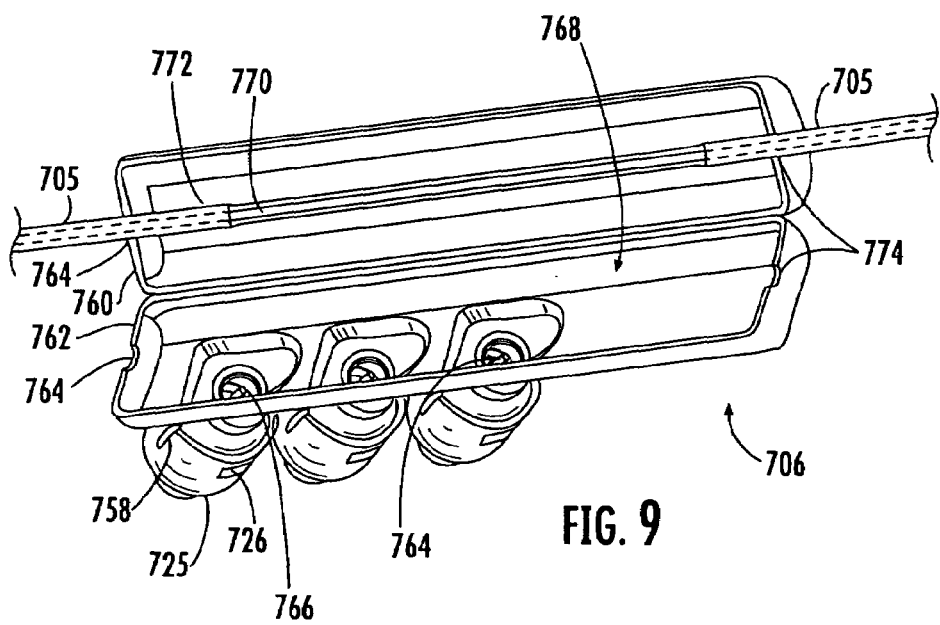
FIG. 9 is a perspective view of the optical fiber termination apparatus of FIG. 7 in an open position.

An optical fiber termination apparatus 706 according to further embodiments of the present invention will now be described with reference to the perspective view illustrations of FIGS. 7-9. Like-numbered elements in the embodiments of FIGS. 7-9 generally correspond to those described with reference to FIGS. 2-6. As shown in the embodiments of FIGS. 7-9, the optical fiber termination apparatus is a taut sheath optical fiber termination apparatus 706. The taut sheath optical fiber termination apparatus 706 includes a longitudinally extending taut sheath splice closure 712. The closure 712 may have a cross sectional area selected to accommodate a taut sheath splice or splices to selected ones of a plurality of optical fibers extending therethrough as part of the optical fiber cable 705. The cross sectional area may be less than that specified to accommodate a minimum bend radius for optical fibers and the splicing may be provided with no slack loops in the closure 712.

As shown in FIG. 9, the cable 705 enters through a first opening 764 on one longitudinal end of the closure 712 and exits through a second opening 774 on a longitudinally displaced end of the splice closure 712, where the openings 764, 774 are configured to receive the optical fiber cable 705 extending through the splice closure 712. The optical fiber cable 705 may include a plurality of optical fibers therein that may pass through a protective tube 770 within the optical fiber cable 705.

A plurality of connector receiving portions 720 are shown extending from branch off portion 716 of the splice closure 712. As shown in FIGS. 7-9, the closure 712 is illustrated having three branch off portions 716 accommodating three connector receiving portions 720. Each of the connector receiving portions 720 is configured to receive an optical connector 727 therein. The optical connector 727, as described with reference to previous embodiments, may be received in an opening of a connector receiving portion 720 without rotating the optical connector 727 relative to the connector receiving portion 720. A sealing member may be positioned between the optical connector 727 and an outer wall of the connector receiving portion 720 to seal a gap therebetween. Also shown in FIGS. 7 and 8 is a cover 725 that is positioned over the optical connector 727 and respective connector receiving portion 720 at each tap point. The cover 725 retains the optical connector 727 in the opening of the connector receiving portion 720 and compresses the sealing member between the outer wall of a connector receiving portion 720 and the optical connector 727 and may do so without rotating the optical connector 727 relative to the connector receiving portion 720. More particularly, a retainer tab 719 is shown as being received in a retainer tab receiving opening 726 of each cover 725. An environmental sealing cap 729 is also shown on a front end optical connection member of each of the optical connectors 727.

Referring now to the perspective view of FIG. 9, the closure 712 is shown in an open position with an upper member 760 rotatably joined to a lower member 762. A back side optical connection member 766 of the optical connector 727 is shown within an optical fiber connector receiving chamber 764 that opens into a splice chamber 768 defined by the closure 712. In various embodiments of the present invention, an optical fiber to be coupled to a respective optical connector 727 may be preconnectorized with an SC connector or the like, which may then be inserted in the back side connection member 766. In other embodiments, an optical fiber may extend from the back side connection member 766 and be spliced by mechanical or other splice means to a fiber separated from the optical fiber cable 705. Also shown in the illustration of FIG. 9 is a slot 758 in the cover 725 that may provide flexibility in slidably fitting the cover 725 over the connector receiving portions 720.

As shown in the embodiments of FIGS. 7-9, the closure 712 is a rectangular box-shaped section with three tap points extending therefrom. It will be understood that other cross sectional shapes, such as oval, round or the like, may also be used to form an enclosing body that houses a taut sheath splice.

Figure 10:
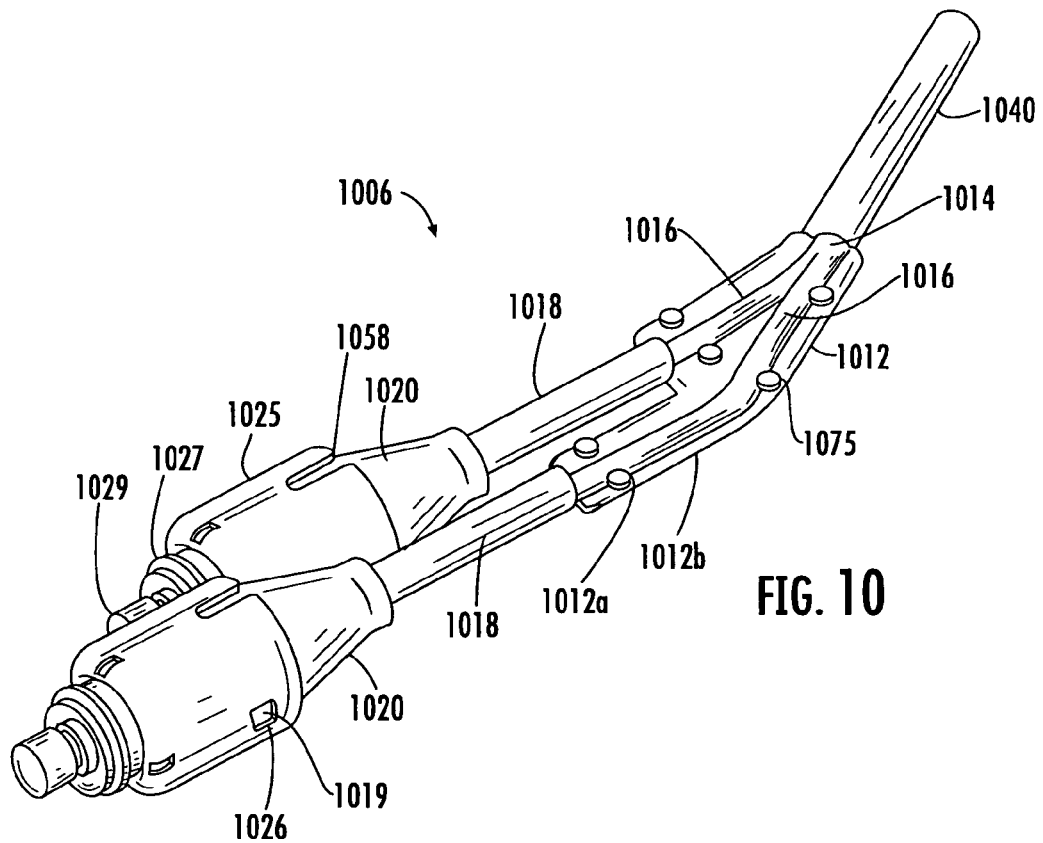
FIG. 10 is a perspective view illustrating an optical fiber termination apparatus according to further embodiments of the present invention.
Figure 11:
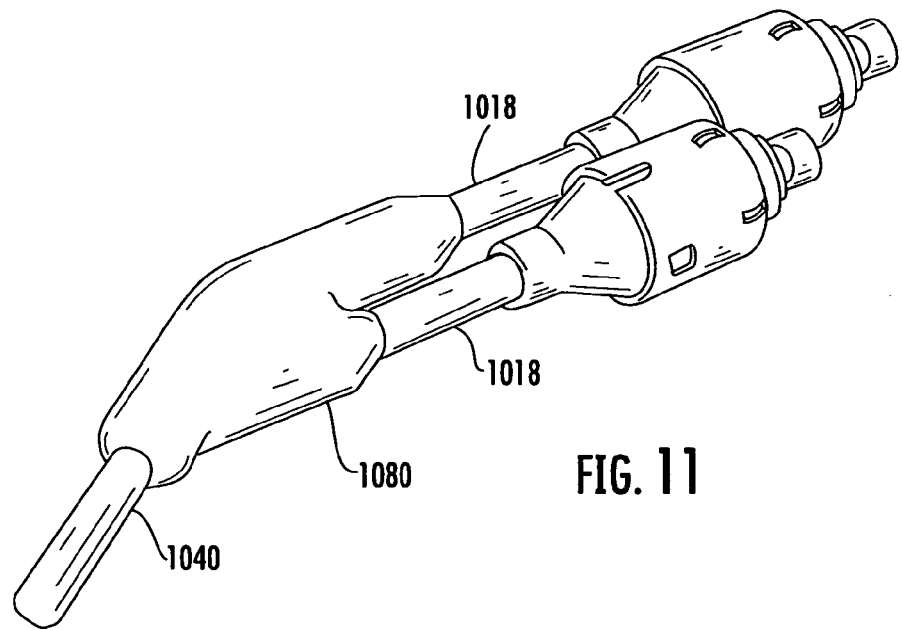
FIG. 11 is a perspective view illustrating the optical fiber termination apparatus of FIG. 10 with overmolding according to some embodiments of the present invention.
Figure 12:
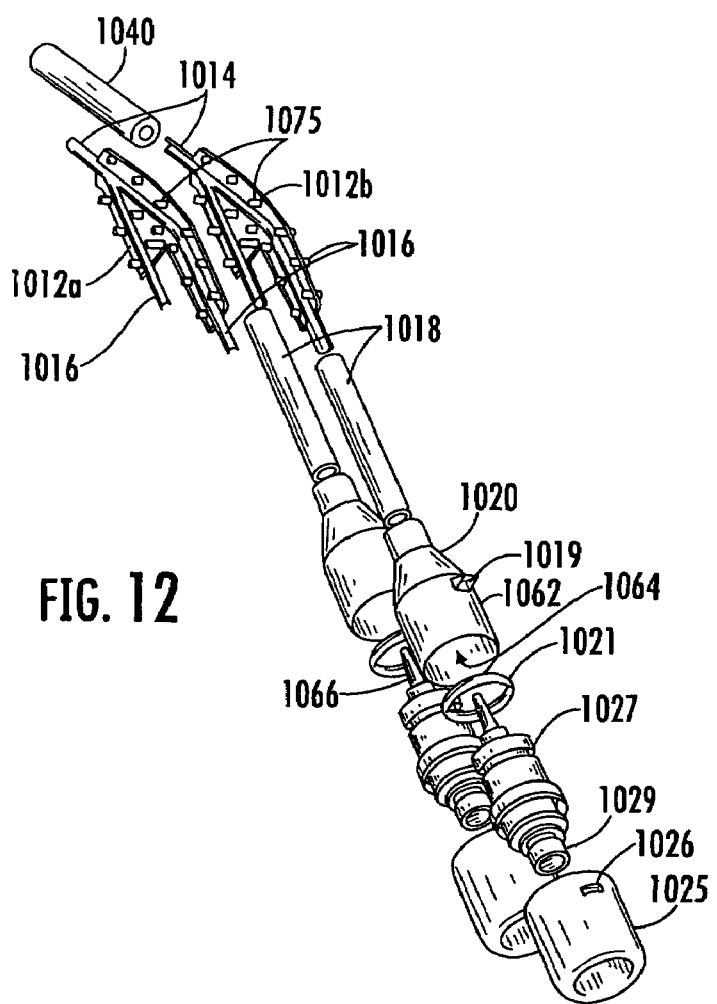
FIG. 12 is an exploded perspective view of the optical fiber termination apparatus of FIG. 10.

Further embodiments of the present invention will now be described with reference to FIGS. 10-12. The embodiments of FIGS. 10-12 illustrate a two tap point arrangement where fibers from respective tap points are joined together at a junction member 1012. Referring first to FIG. 10, an optical fiber cable or tube 1040 is coupled to an inlet passageway 1014 of the junction member 1012. The junction member 1012 couples the inlet passageway 1014 to multiple outlet passageways 1016, two of which are illustrated for exemplary purposes in FIGS. 10-12.

A tubing section 1018 extends from each of the outlet passageways 1016. A connector receiving portion 1020 is positioned on an end of each of the tubing sections 1018 displaced from the junction member 1012. The tubing sections 1018 couple a receiving chamber in the connector receiving portions 1020 to the respective outlet passageways 1016 and thereby to the inlet passageway 1014. Note that various like-numbered features shown in the embodiments of FIGS. 10-12 function substantially as described previously with reference to the embodiments of FIGS. 2-9, including an optical connector 1027 with an environmental protective closure cap 1029 thereon, a cover 1025 to retain the optical connector 1027 in the connector receiving portion 1020, slot 1058, retainer tab 1019, and retainer tab receiving opening 1026.

As illustrated in FIG. 12 and FIG. 10, the junction member 1012 may include an upper part 1012a and a lower part 1012b coupled to the upper part 1012a. A plurality of connectors 1075 may be used to couple the upper 1012a and lower 1012b parts. The upper and lower parts 1012a, 1012b define the inlet passageway 1014 and the plurality of outlet passageways 1016.

Further details of the mounting of the optical connectors 1027 are illustrated in the exploded perspective view of FIG. 12. As shown in FIG. 12, the optical connector 1027 is positioned in the receiving chamber 1064 of the connector receiving portion through an opening 1066 thereto, with sealing member 1021 positioned between the optical connector 1027 and the outer wall 1062 of the connector receiving portion 1020. The cover 1025 may then be slidably positioned over or within the optical connector 1027 to retain it in the connector receiving portion 1020 while providing compression of the sealing member 1021 so as to environmentally seal the receiving chamber 1066 and the back side connection member of the optical connector 1027 positioned therein.

FIG. 11 is a perspective view of the optical fiber termination apparatus 1006 of FIG. 10 with a protective overmolding thereon. As shown in the embodiments of FIG. 11, the overmolding 1080 may cover the junction member 1012 and portions of the tube 1040 and the tubes 1018 extending therefrom.

Figure 13A:
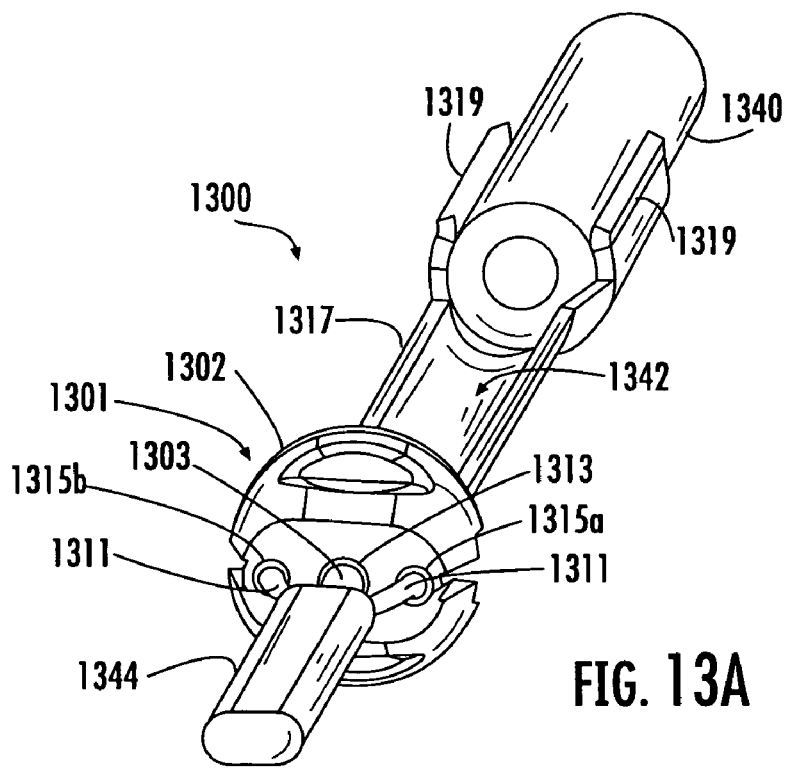
FIGS. 13A and 13B are perspective views illustrating an entry sealing member suitable for use with an optical fiber termination apparatus according to some embodiments of the present invention.
Figure 13B:
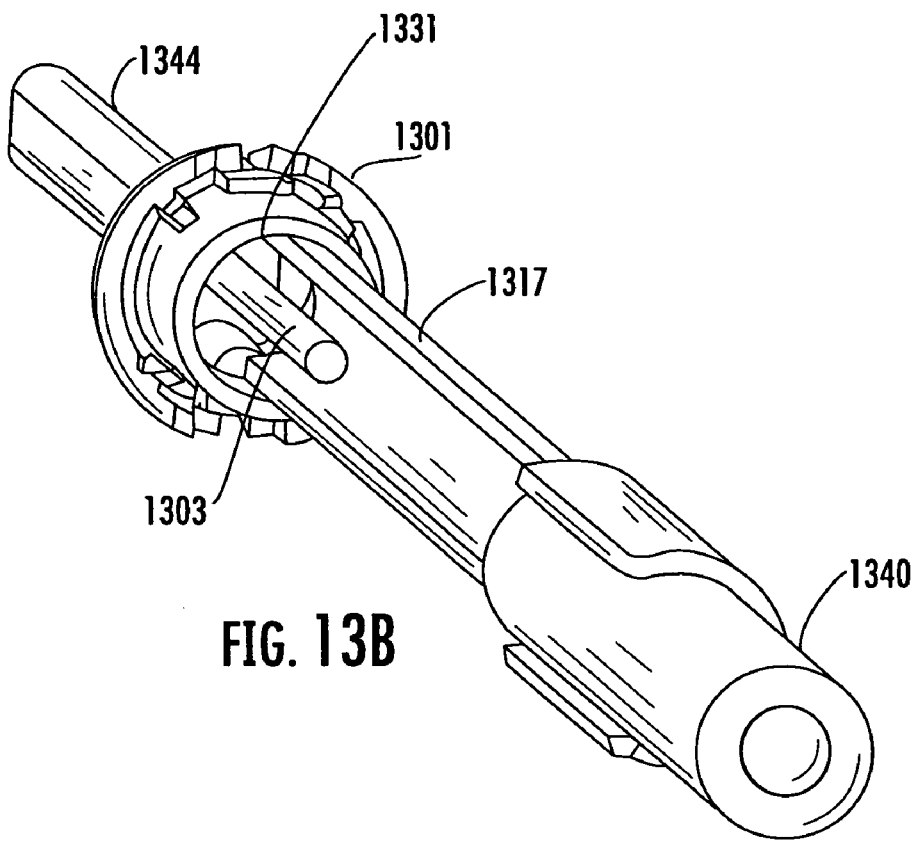
Figure 14:
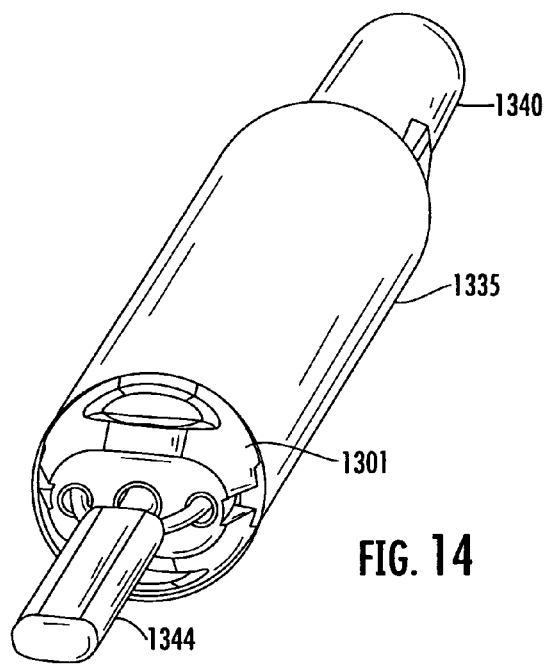
FIG. 14 is an assembled perspective view illustrating the entry sealing member of FIGS. 13A and 13B.

Further embodiments of the present invention will now be described with reference to FIGS. 13A, 13B and 14. As shown in FIGS. 13A and 13B, some embodiments of the present invention provide a splice container 1300 including an end portion 1301 suitable for providing sealing features in a region where optical fibers from an optical fiber termination apparatus 106, 206, 506, 1006 are spliced to fibers from a drop cable or the like. As will be described herein, the end portion 1301 may separate strength members 1311 from an optical fiber containing tube or optical fiber 1303, all of which extend from an optical fiber cable 1344, to allow sealant or the like to flow therebetween. As a result, environmental sealing may be provided to the inside of the fiber cable 1344, in case leaks or the like therein may otherwise allow moisture to reach a region in proximity to the end portion 1301, in particular, the splice chamber 1342. Sealing may also be provided around an external circumference of the end portion 1301 with respect to a closure housing 1335 as shown in FIG. 14.

Referring now to FIGS. 13A and 13B, an optical fiber cable, in particular a flat drop cable 1344, includes strength members 1311 on opposite sides and radially displaced from a central optical fiber or optical fiber containing tube 1303. The optical fiber containing tube 1303 extends into the splice chamber 1342 defined by a connecting member 1317 through a first opening 1313 in a body portion 1302 of the end portion 1301. As seen in FIG. 14, the body portion 1302 is configured to be sealingly received in an opening to the splice chamber 1342 defined in an end of the closure 1335.

Two second longitudinally extending openings 1315a, 1315b extend through the body portion 1302 substantially in parallel with the first opening 1313. The second openings 1315a, 1315b are radially displaced from the first opening 1313 a distance selected to separate the strength members 1311 from the optical fiber tube 1303 to allow a sealant material to flow therebetween to environmentally seal an inside of the optical fiber cable 1344. The connecting member 1317 includes grip portions 1319 on an end thereof opposite the body portion 1302 configured to retain an optical fiber carrying tube 1340. However, in some embodiments of the present invention, an end portion 1301 may be provided on each of two longitudinally displaced ends defining entrances to the splice chamber 1342 for use in splicing an optical fiber from two optical fiber cables 1344.

Figure 15:
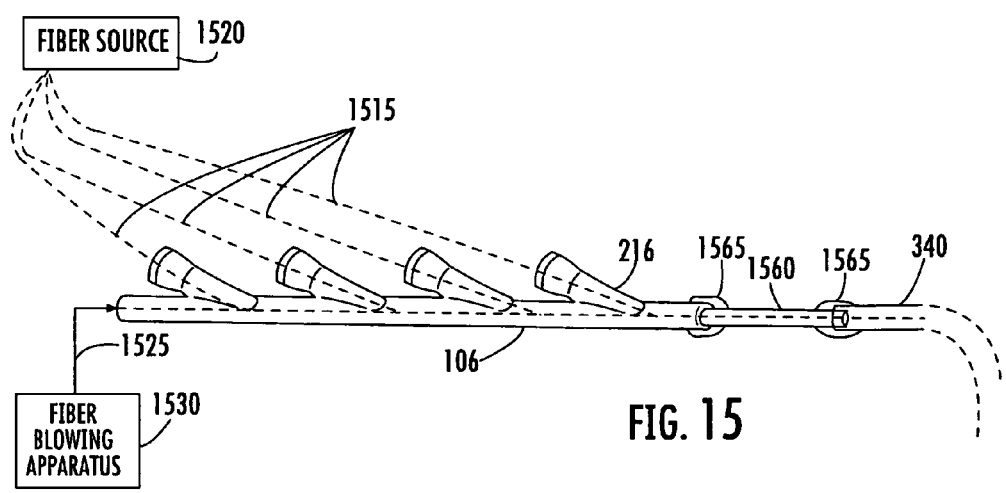
FIG. 15 is a schematic view of an optical fiber installation apparatus and optical fiber termination apparatus according to some embodiments of the present invention.
Figure 16:
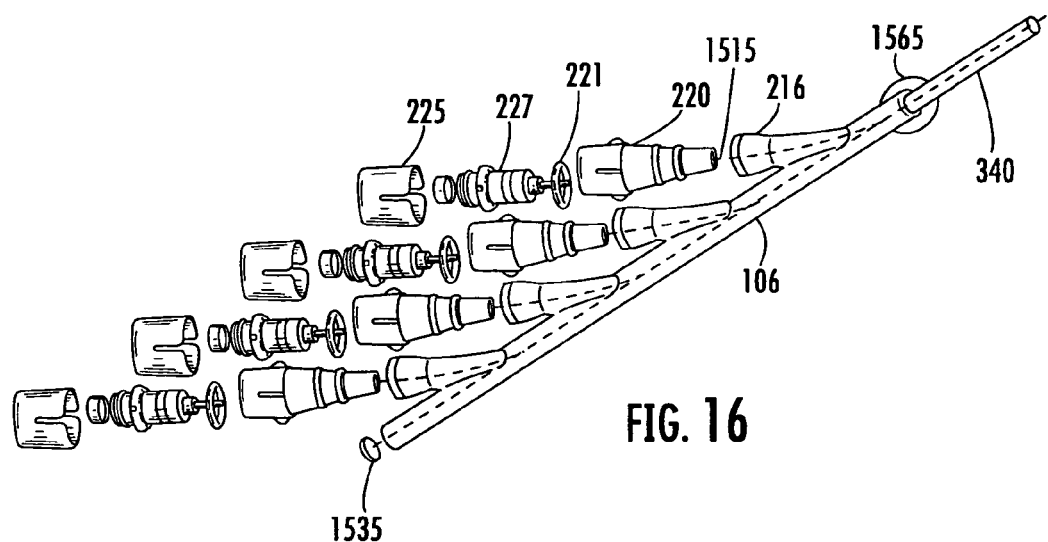
FIG. 16 is a perspective view illustrating an optical fiber termination apparatus according to some embodiments of the present invention.

Further embodiments of the present invention will now be described with reference to FIGS. 15 and 16. More particularly, the embodiments illustrated in FIGS. 15 and 16 utilize feeding of optical fibers into the apparatus 106 and through a tube long enough to reach a connection point, such as a main distribution line, without the use of an intervening splice closure. As shown in FIG. 15, an extended length of hollow tubing 340 suitable for routing all the way to a main distribution optical fiber cable splice point is provided coupled to the apparatus 106. Individual optical fibers 1515 are fed through respective openings in the branch-off sections 216 and extend through the tubing 340 back to the splice point at the main distribution optical fiber cable. The optical fibers 1515 may be fed into the apparatus 106 and tubing 340 in a factory and then the apparatus 108 and tubing 340, with fibers 1515 therein, may be deployed into the field with the ends of the optical fibers 1515 at an end of the tubing 340 remote from the apparatus 106 spliced into a distribution optical fiber cable or the like.

As shown in FIG. 15, the individual optical fibers 1515 may be drawn from a fiber source 1520, such as a spool of optical fiber. Individual fibers 1515 may be blown through the apparatus 106 and tubing 340 utilizing an air stream 1525 from a fiber blowing apparatus 1530. Equipment and techniques for blowing of fiber through a tube are known in the art and will not be further described herein.

In the particular embodiments of FIG. 15, the apparatus 106 is shown coupled to the tubing 340 through a coupling tube 1560. Overmolding 1565 is shown to seal the respective connection points between the coupling tube 1560 and the apparatus 106 and the tubing 340. However, as seen in FIG. 16, the tubing 340 may be directly coupled to the apparatus 106 with the overmolding 1565 sealing the connection therebetween. Also shown in FIG. 16 is an end cap plug 1535 that may be utilized to seal the end of the apparatus 106 after blow feeding of the individual optical fibers 1515. The optical fibers 1515 may be coupled to the OptiTap™ connector 227 as previously described herein with further assembly aspects of the various other components illustrated in FIG. 16 preceding substantially as described previously herein.

Accordingly, with embodiments such as those described with reference to FIGS. 15 and 16, an optical fiber terminal 106 may be provided with an extensive length of tubing 340 extending therefrom including a plurality of optical fibers 1515 so that an intermediate splice chamber between the apparatus 106 and a main distribution line or other optical fiber cable field may be unneeded. In particular embodiments, the tubing 340 is made from a material having mechanical, flexibility and the like properties substantially corresponding to the outer sheathing utilized currently in conventional fiber optic drop cables so that handling of the extensive length of the tubing 340 may proceed as is conventionally done with such fiber optical drop cables. Furthermore, while shown with an apparatus 106 having four branch off sections 216 in FIG. 15, the apparatus 106 for the embodiments of FIGS. 15 and 16 may conform with any of the various embodiments described previously herein.

Figure 17:
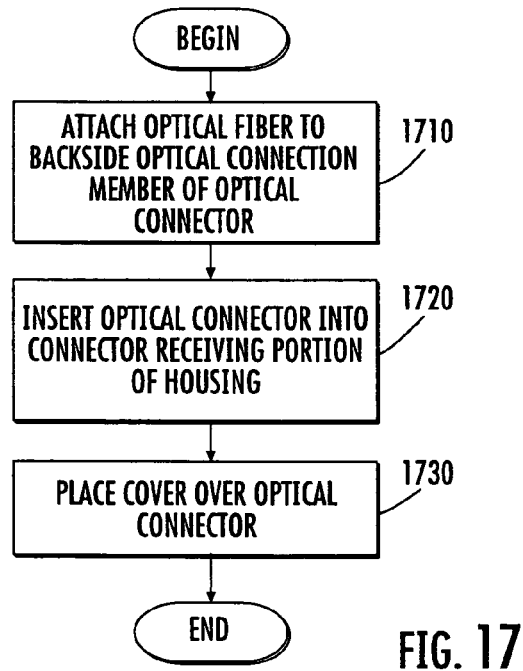
FIG. 17 is a flowchart illustrating operations for inserting an optical connector in a connector receiving portion of a housing according to some embodiments of the present invention.

Methods of inserting an optical connector in a connector receiving portion of a housing according to some embodiments of the present invention will now be described with reference to the flow chart illustration of FIG. 17. As shown in FIG. 17, operations begin by attaching an optical fiber in the connector receiving portion to a back side optical connection member of the optical connector (block 1710). The optical connector with the optical fiber attached thereto is inserted in an optical fiber connector receiving chamber of the connector receiving portion through an opening thereto in an end of the connector receiving portion displaced from the housing (block 1720). A sealing member is positioned between the optical connector and the connector receiving portion when the optical connector is inserted in the receiving chamber to seal a gap therebetween. A cover is placed on the optical connector and the connector receiving portion to retain the optical connector in the opening and to compress the sealing member without rotating the optical connector relative to the connector receiving portion (block 1730).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An optical fiber termination apparatus, comprising:
   a body portion having an optical fiber outlet therein;
   a connector receiving portion extending from the body portion and having an outer wall defining an optical fiber connector receiving chamber and having an opening to the connector receiving chamber at an end thereof spaced from the body portion;
   an optical connector positioned in the opening, wherein the opening is configured to receive the optical connector therein without rotating the optical connector relative to the connector receiving portion;
   a sealing member positioned between the optical connector and the outer wall of the connector receiving portion to seal a gap therebetween; and
   a cover positioned on the optical connector and the connector receiving portion that retains the optical connector in the opening and compresses the sealing member between the outer wall of the connector receiving portion and the optical connector without rotating the optical connector relative to the connector receiving portion.

2. The apparatus of claim 1, wherein the cover is slidably positioned over the connector receiving opening and wherein an outer surface of the connector receiving portion is configured to receive and retain the cover without rotating the optical connector relative to the connector receiving portion.

3. The apparatus of claim 2, further comprising:
   a retainer tab on the outer surface of the connector receiving portion; and
   a retainer tab receiving opening on the cover positioned to receive and retain the retainer tab when the cover is positioned over the optical connector at a position that compresses the sealing member.

4. The apparatus of claim 2, wherein the cover is coupled to the connector receiving portion so as to limit rotational movement of the cover relative to the connector receiving portion and to limit rotational movement of the optical connector relative to the connector receiving portion.

5. The apparatus of claim 4, wherein the connector receiving chamber has a size less than a minimum fiber bend radius requirement for an optical fiber.

6. The apparatus of claim 5, further comprising an optical fiber extending into the connector receiving chamber from the body portion and optically coupled to a backside connection member of the optical connector, wherein the optical fiber is free of loops in the connector receiving chamber.

7. The apparatus of claim 2, wherein the optical fiber termination apparatus comprises a plurality of connector receiving portions extending from the body portion, each of the connector receiving portions including an optical connector therein and a sealing member positioned between the respective optical connectors and outer walls of the respective connector receiving portions.

8. The apparatus of claim 7, wherein the body portion comprises a plurality of branch off sections, each of the branch of sections including a main passageway portion and a branch off passageway portion, the branch off sections being coupled together at ends of the main passageway portions to define a main passageway extending therethrough, and wherein one of the connector receiving portions is positioned at an end of each of the branch off passageway portions displaced from the main passageway with a branch off passageway of each passageway portion extending from the main passageway to the receiving chamber of its respective connector receiving portion to allow an optical fiber from the receiving chamber to extend through the branch off passageway to the main passageway.

9. The apparatus of claim 8, further comprising an overmolding layer over the branch off sections.

10. The apparatus of claim 8, wherein the branch off passageway portion further comprises an intersection portion extending from the main passageway portion and a tube portion extending from the intersection portion to the connector receiving portion.

11. The apparatus of claim 8, wherein a plurality of branch off passageway portions extend from each main passageway portion.

12. The apparatus of claim 8, further comprising a plug in an end of the main passageway of a last of the coupled together branch off sections that seals the main passageway.

13. The apparatus of claim 10, wherein each of the main passageway portions and their respective intersection portion are unitary molded members.

14. The apparatus of claim 2 wherein the body portion comprises:
   a junction member having an inlet passageway therein coupled to a plurality of outlet passageways; and
   a tubing section extending from each of the plurality of outlet passageways, one of the connector receiving portions being positioned on an end of each of the tubing sections displaced from the junction member, wherein the tubing sections couple the receiving chamber of the connector receiving portions to the respective outlet passageways.

15. The apparatus of claim 14, further comprising an overmolding layer over the junction member and an end of each of the tubing sections adjacent thereto.

16. The apparatus of claim 15, wherein the junction member comprises:
   an upper part;

a lower part coupled to the upper part, wherein the upper and/or lower part define the inlet passageway and the plurality of outlet passageways; and a plurality of connectors coupling the upper and lower parts.

17. The apparatus of claim 2, further comprising:

a splice container defining a splice chamber therein; and an optical cable extending from the splice chamber to the body portion, the optical cable including an optical fiber extending to the receiving chamber and coupled to a backside of the optical connector, wherein the splice container includes a first opening configured to receive the optical cable extending from the splice chamber and a second opening configured to receive an optical fiber cable including an optical fiber to be spliced to the optical fiber extending to the receiving chamber.

18. The apparatus of claim 2, further comprising a removable cap covering a front side optical receptacle of the optical connector.

19. The apparatus of claim 1, wherein the body portion comprises a longitudinally extending taut sheath splice closure having openings on longitudinally displayed ends thereof configured to receive an optical fiber cable extending through the body portion, wherein a cross-sectional area of the closure is less than that specified to accommodate a minimum bend radius for optical fibers.

20. The apparatus of claim 1, wherein the body portion comprises a plurality of branch off sections, each of the branch off sections including a main passageway portion and a branch off passageway portion, the branch off sections being coupled together at ends of the main passageways.

21. A taut sheath optical fiber termination apparatus, comprising:

a longitudinally extending taut sheath splice closure having a cross-sectional area selected to accommodate a taut sheath splice to selected ones of a plurality of optical fibers extending therethrough, wherein the cross-sectional area of the closure is less than that specified to accommodate a minimum bend radius for optical fibers;

a first and second opening on longitudinally displayed ends of the splice closure configured to receive an optical fiber cable extending through the splice closure, the optical fiber cable including the plurality of optical fibers; and a plurality of connector receiving portions extending from the splice closure, each of the connector receiving portions being configured to receive an optical connector therein;

an optical connector positioned in each of the connector receiving portions.

22. The apparatus of claim 21, further comprising:

a sealing member positioned between the optical connector and the connector receiving portion to seal a gap therebetween; and a cover positioned over the optical connector and the connector receiving portion that retains the optical connector in the connector receiving portion and compresses the sealing member between the connector receiving portion and the optical connector without rotating the optical connector relative to the connector receiving portion.

23. The apparatus of claim 21, wherein the connector receiving portions each have an optical fiber connector receiving chamber and an opening to the connector receiving chamber at an end thereof displaced from the splice closure, the opening being configured to receive the optical connector therein, and wherein the optical connectors are positioned in openings.

24. A method of inserting an optical connector in a connector receiving portion of a housing, comprising:

attaching an optical fiber in the connector receiving portion to a backside optical connection member of the optical connector;

inserting the optical connector with the optical fiber attached thereto in an optical fiber connector receiving chamber of the connector receiving portion through an opening thereto in an end of the connector receiving portion displaced from the housing, with a sealing member positioned between the optical connector and the connector receiving portion to seal a gap therebetween;

placing a cover on the optical connector and the connector receiving portion to retain the optical connector in the opening and to compress the sealing member without rotating the optical connector relative to the connector receiving portion.

* * * * *